(12) United States Patent
Morrison

(10) Patent No.: US 9,027,599 B2
(45) Date of Patent: May 12, 2015

(54) PRESSURE RELIEF/DRAIN VALVE FOR CONCRETE PUMPERS

(71) Applicant: Jeffrey L. Morrison, Sonora, CA (US)

(72) Inventor: Jeffrey L. Morrison, Sonora, CA (US)

(*) Notice: Subject to any disclaimer, the term of this patent is extended or adjusted under 35 U.S.C. 154(b) by 276 days.

(21) Appl. No.: 13/738,839

(22) Filed: Jan. 10, 2013

(65) Prior Publication Data
US 2013/0180612 A1  Jul. 18, 2013

Related U.S. Application Data

(60) Provisional application No. 61/586,739, filed on Jan. 13, 2012.

(51) Int. Cl.
*F16K 31/50* (2006.01)

(52) U.S. Cl.
CPC ........................ *F16K 31/50* (2013.01)

(58) Field of Classification Search
CPC ..................................................... F16K 31/50
USPC ..................... 137/886, 874; 251/347, 341
See application file for complete search history.

(56) References Cited

U.S. PATENT DOCUMENTS

| | | | | |
|---|---|---|---|---|
| 130,726 A * | 8/1872 | Latta | ............................ | 137/299 |
| 210,854 A * | 12/1878 | Innis | ............................ | 137/886 |
| 2,603,102 A * | 7/1952 | Hobbs | ............................ | 74/520 |
| 4,373,225 A * | 2/1983 | Eckardstein et al. | .... | 15/104.062 |
| 7,458,558 B1 * | 12/2008 | Toth | ............................ | 251/145 |
| 7,975,724 B2 * | 7/2011 | Ward | ............................ | 137/886 |
| 2007/0189108 A1 * | 8/2007 | Lindblom et al. | ............. | 366/30 |

* cited by examiner

*Primary Examiner* — Craig Schneider
*Assistant Examiner* — Christopher Ballman
(74) *Attorney, Agent, or Firm* — Edward S. Wright

(57) ABSTRACT

Pressure relief/drainage valve for a concrete pumper having a valve body with an axially extending passageway through which concrete flowing in a pumping line passes, an outlet port in a side wall of the passageway, and a valve member which prevents concrete from passing through the port when the valve is a closed position and permits concrete to discharge through the outlet port when the valve is in an open position.

18 Claims, 3 Drawing Sheets

PRESSURE RELIEF/DRAIN VALVE FOR CONCRETE PUMPERS

RELATED APPLICATION

Provisional Application No. 61/586,739, filed Jan. 13, 2012, the priority of which is claimed.

BACKGROUND OF THE INVENTION

1. Field of Invention

This invention pertains generally to concrete pumping and, more particularly, to a pressure relief and drainage valve for use with concrete pumpers.

2. Related Art

Concrete pumpers are widely used for transferring concrete in liquid form from a truck to a job site for use in the construction of various types of structures, including foundations, footings, floors, slabs, and the like. The concrete is pumped through a long line such as a hose or pipe in which blockages can, and sometimes do, occur. Clearing such blockages is time consuming and potentially hazardous, both to the pump operator and to the environment.

When concrete is being pumped vertically as, for example, in a high-rise building, draining the concrete out of the line upon completion of the job can also be a problem.

OBJECTS AND SUMMARY OF THE INVENTION

It is, in general, an object of the invention to provide a new and improved pressure relief and drainage valve for use with concrete pumpers and the like.

Another object of the invention is to provide a pressure relief and drainage valve of the above character which overcomes the limitations and disadvantages of techniques heretofore employed in unblocking and draining concrete pumping lines.

These and other objects are achieved in accordance with the invention by providing a pressure relief/drainage valve for a concrete pumper having a valve body with an axially extending passageway through which concrete flowing in a pumping line passes, an outlet port in a side wall of the passageway, and a valve member which prevents concrete from passing through the port when the valve is a closed position and permits concrete to discharge through the outlet port when the valve is in an open position.

DETAILED DESCRIPTION

Figure 1:
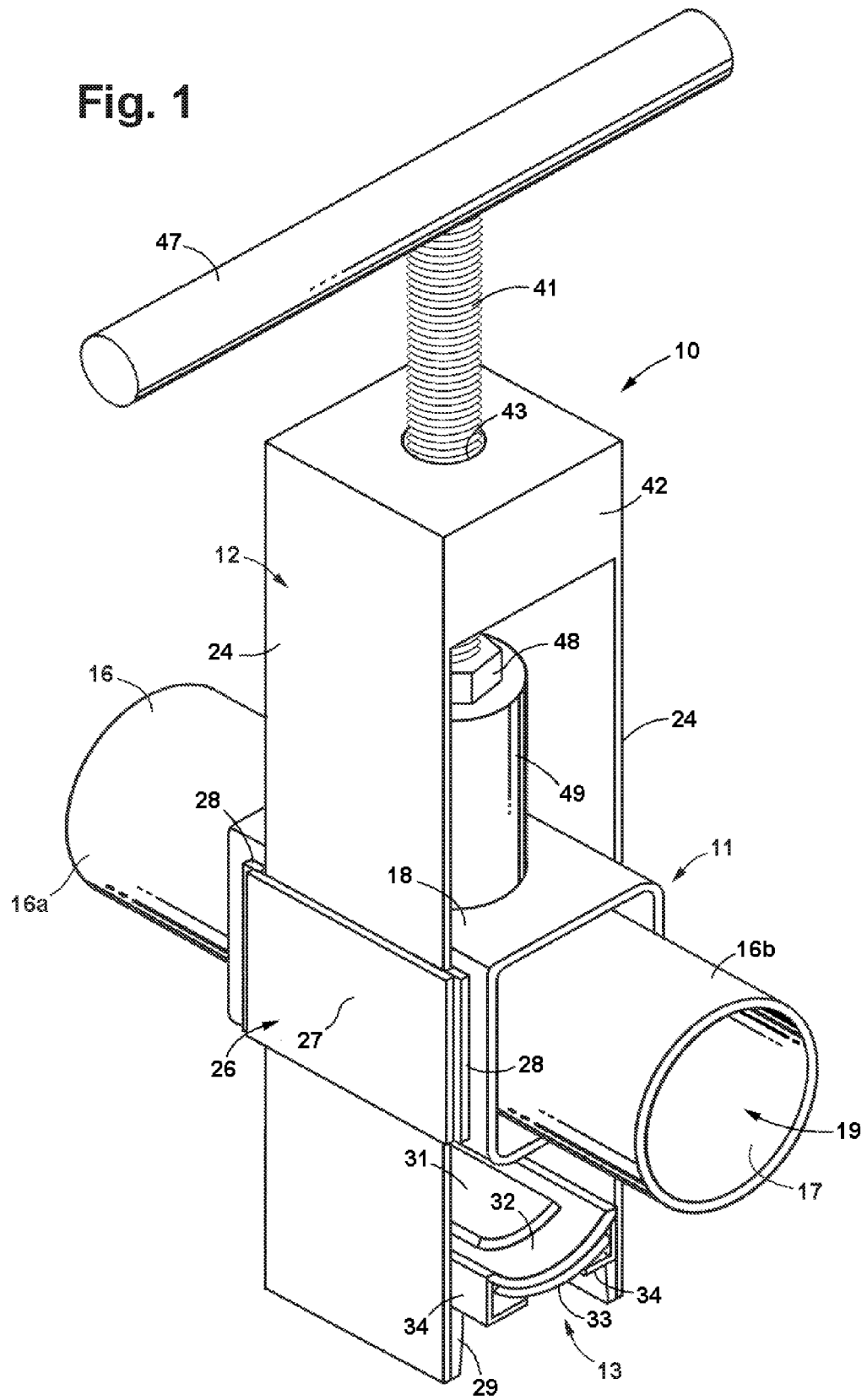
FIG. 1 is an isometric view of one embodiment of a pressure relief and drainage valve incorporating the invention.
Figure 2:
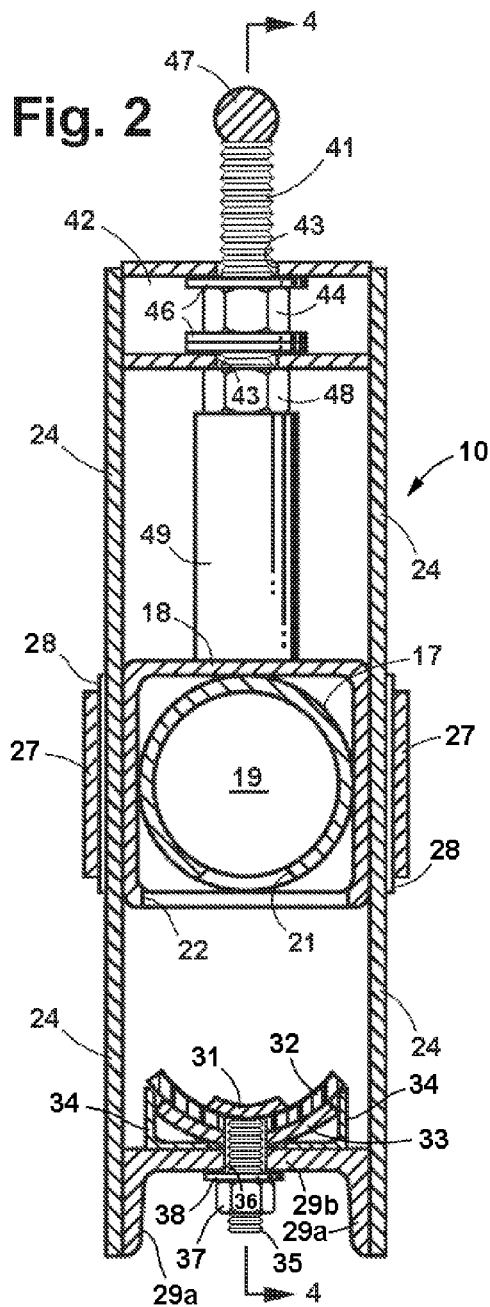
FIG. 2 is a vertical sectional view of the embodiment of FIG. 1 with the valve in an open position and the handle rotated 90 degrees from the position shown in FIG. 1.
Figure 3:
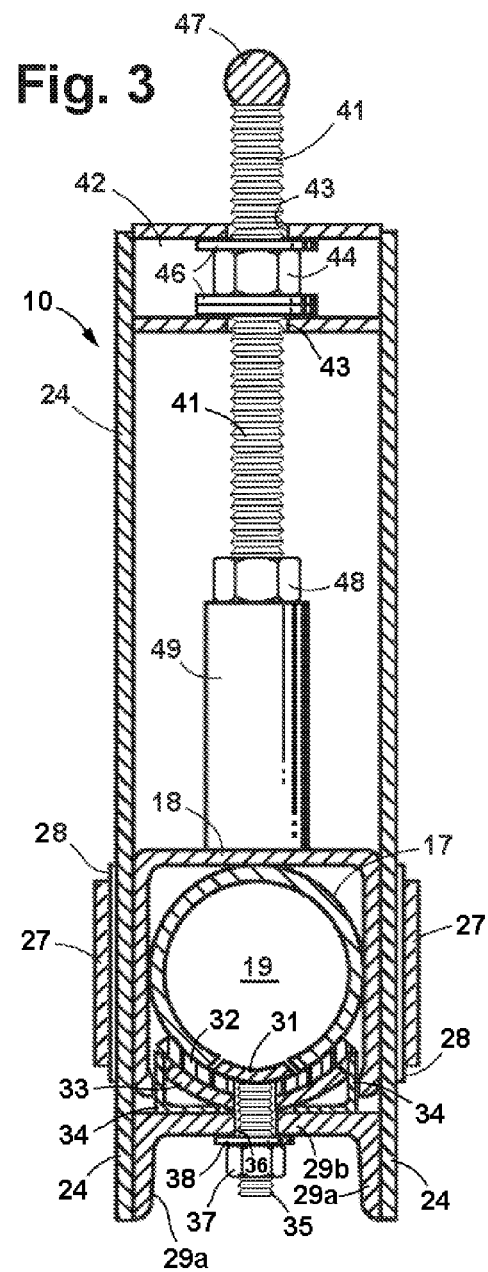
FIG. 3 is a view similar to FIG. 2 with the valve in the closed position.
Figure 4:
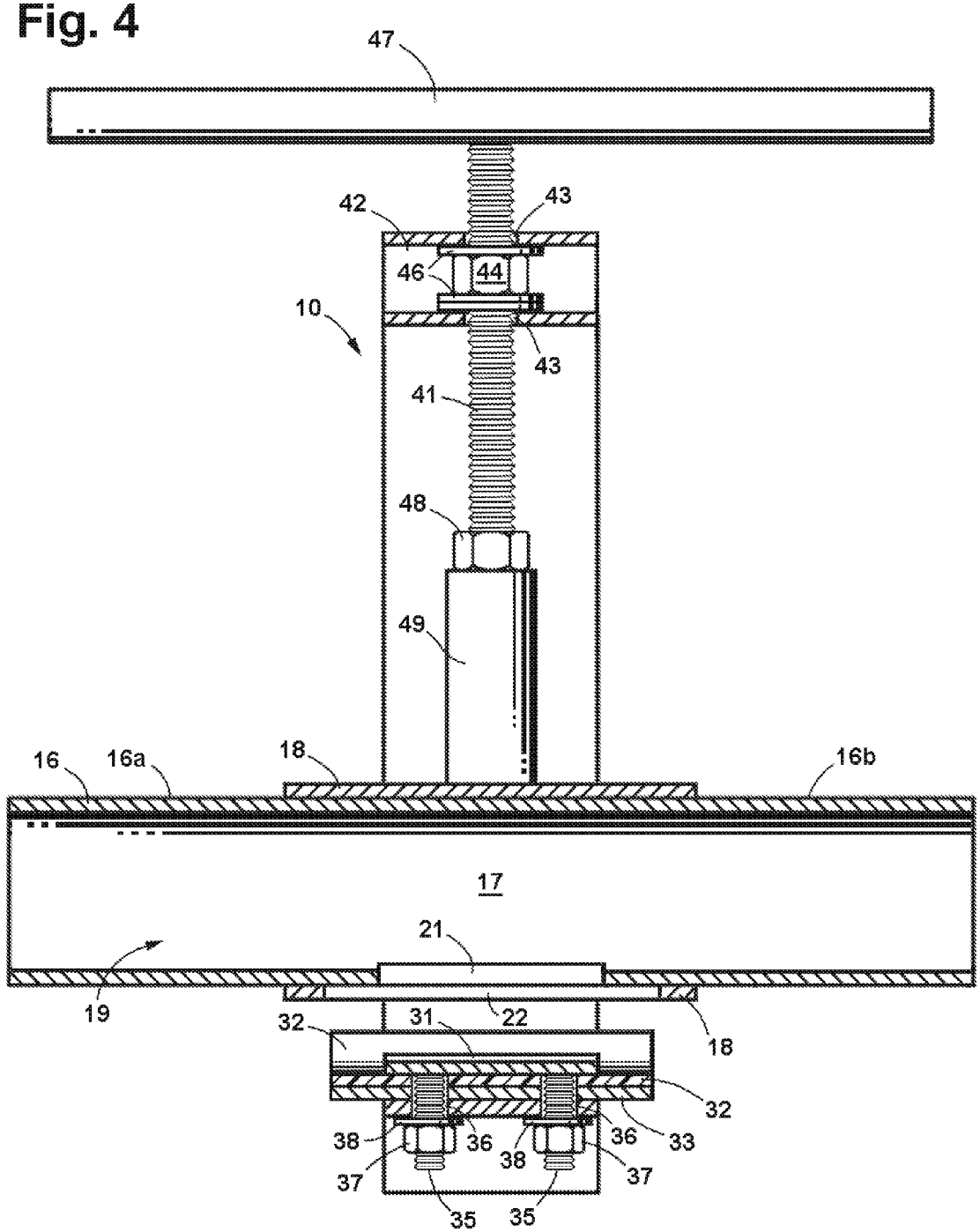
FIG. 4 is a cross-sectional view taken along line 4-4 of FIG. 2.

As illustrated in the drawings, the valve 10 has a body 11 slidably mounted on an upright frame 12, with a valve member and seal assembly 13 mounted in a fixed position toward the lower end of the frame.

The body comprises a tubular member or pipe 16 having a cylindrical side wall 17 and a diameter corresponding to the line with which the valve is to be used. The pipe is mounted within a square tubular housing or sleeve 18 and is affixed to the sleeve by suitable means such as welding. End portions 16a, 16b of the pipe extend outwardly from opposite ends of the sleeve for connection to the line, with a passageway 19 extending through the pipe. An outlet opening or port 21 is formed in the side wall of the pipe on the under side of the valve body, and a portion of the bottom wall of the sleeve is cut away to provide an access opening 22 which surrounds the port.

The frame has a pair of uprights 24 on which the valve body is slidably mounted. The uprights are generally rectangular in horizontal section and are spaced apart by a distance slightly greater than the width of the sleeve. The valve body is retained on the uprights by guide brackets 26 affixed to the side walls of the sleeve. In the embodiment illustrated, the guide brackets consist of flat, generally rectangular plates 27, with spacers 28 between the side walls and the plates. The thickness of the spacers is slightly greater than the thickness of the uprights, and the spacing between them is slightly greater than the width of the uprights so the body can slide freely on the uprights.

The valve member and seal are mounted on a base 29 at the lower end of the frame. In the embodiment illustrated, the base is formed from an inverted, generally U-shaped channel member having a pair of downwardly extending flanges 29a affixed to the lower portions of the uprights, with a web 29b between the flanges.

The valve member includes a plug 31 of a size and shape corresponding to the outlet port 21 in the valve body, and in one presently preferred embodiment, the piece cut from the side wall of the pipe to form the port is utilized as the plug. When the valve is in the closed position, the opening is sealed by a rubber gasket 32 of greater lateral dimension than the port and plug. The gasket rests in a cylindrically curved seat 33 which is disposed concentrically of the pipe in the closed position and has a radius of curvature that is just enough greater than that of the pipe to ensure a tight seal between the gasket and the pipe when the valve is closed. The gasket seat is affixed to the base by suitable means such as welding and is supported toward its outer edges by L-shaped brackets 34 which run parallel to the edges. The plug and gasket are affixed to the gasket seat and the base by mounting screws 35 which are affixed to the under side of the plug and pass through clearance holes 36 in the gasket, seat, and base, with nuts 37 and washers 38 on the screws on the under side of the base. The gasket and seat are of lesser dimension than the opening in the bottom wall of the sleeve and pass freely through it.

The valve is moved between its open and closed positions by an operating screw 41 which is rotatively mounted in a box 42 at the upper end of uprights 24. The screw passes through clearance holes 43 in the upper and lower walls of the box and is constrained against axial movement by a nut 44 which is welded to the screw, with washers 46 between the nut and the walls. A handle 47 is affixed to the upper end of the screw for rotating the screw about its axis.

The operating screw is threadedly received in a nut 48 affixed to the upper end of an axially elongated housing or stem 49 affixed to the upper wall of the valve body. With the screw constrained against axial movement, rotation of the screw in one direction moves the valve body in a downward direction toward the closed position, and rotation in the other direction moves the body in an upward direction toward the open position.

All parts of the valve except the rubber gasket are made of steel, and the gasket is easily replaced by opening the valve, removing the nuts from the mounting screws for the plug, and withdrawing the plug to expose the gasket.

Figure 5:
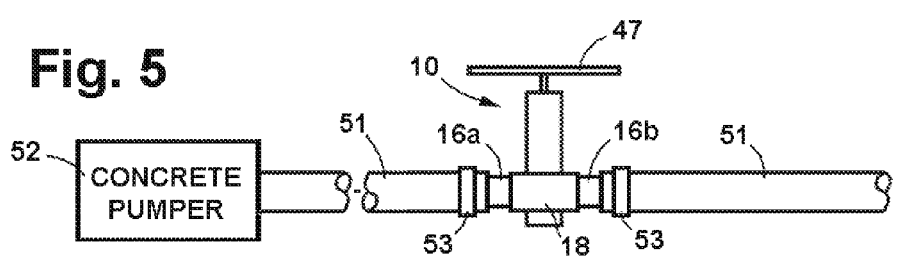
FIG. 5 is a side elevational view of the pressure relief and drainage valve of the invention connected inline with a concrete pumping line.

In operation and use, as best seen in FIG. 5, valve 10 is connected inline with the discharge line 51 of a concrete pumper 52, with connectors 53 such as heavy duty VICTAU-LIC® or CAM-LOCK® hose clamps securing the line to the ends 16a, 16b of valve pipe 16. In normal operation, valve body 11 is held tightly against gasket seat 33 by operating screw 41, with gasket 32 being compressed between its seat and the side wall of the pipe, forming a liquid-tight seal around outlet port 21. In addition to holding the gasket in place, plug 33 helps to guide the valve member and body together in the proper alignment. It also serves as a void filler in the pipe and provides a wear surface that protects the rubber gasket from the abrasive action of the concrete. The valve is opened by turning the operating screw with handle 47 to withdraw the valve body from the valve member.

The valve is preferably installed immediately before all reducers in the pumping line since that is the most common location for clogging to occur. However, the valve can also be installed in other locations, and multiple valves may be used for long distance pumping.

In the event blockage should occur, the valve is opened to relieve pressure in the line and allow material in the line to flow out of the line and into a suitable containment system. This ensures that the user will not be harmed and that there is no chance of contaminating the surrounding area. The material causing the blockage can then be removed safely, following which the valve should be rinsed off with water and then closed. The pump line can then be reassembled and pumping resumed.

When pumping vertically, the valve is positioned over a large container, or containers, depending upon the volume in the pump line, and a container of water is positioned at the final destination of the pour. Upon completion of pumping, the end of the hose is shaken out, and an appropriately sized wash-out ball is installed. The end of the hose is then inserted into the container of water, and the valve is slowly opened to allow excess material to draw down safely by gravity. The valve can be opened and shut as needed to control the flow and permit changing out filled containers. Water is siphoned behind the ball, thereby draining excess material out of the hose and flushing the line as well.

The invention has a number of important features and advantages. It provides a structurally reinforced mechanical valve designed to safely release pressure in a pressurized line where normal gate and ball valves will not work. The valve is designed for the concrete pumping industry and is easily connected inline with concrete pump hoses or pipes using conventional hose clamps and connectors. The smooth, uninterrupted passageway in the valve body allows the material to flow through without any obstructions to flow or voids where material can build up. The valve can be used to relieve pressure on the hose safely and quickly if the line becomes clogged, which allows the pump operator to unclamp hoses and remove the plugged material quickly and safely. It can also be used as a drain down for vertical pumping, and it can be made in different sizes for different pump lines.

Although in the disclosed embodiment, the valve member is mounted in a fixed position, and the valve body is moved to open and close the valve, in other embodiments the valve body can be held in a stationary position, with the valve member being moved to do the opening and closing.

It is apparent from the foregoing that a new and improved pressure relief and drainage valve has been provided. While only certain presently preferred embodiments have been described in detail, as will be apparent to those familiar with the art, certain changes and modifications can be made without departing from the scope of the invention, as defined by the following claims.

The invention claimed is:

1. An inline pressure relief/drainage valve for a concrete pumper, comprising a tubular body having an axially extending passageway, means for connecting the tubular body inline with a concrete pumping line so that concrete flowing in the line flows through the passageway, an outlet port in a side wall of the tubular body, and a valve member comprising a plug which extends into the outlet port when the valve is in a closed position, a gasket which is in sealing engagement with the outer side of the wall around the outlet port when the valve is in the closed position, and a valve seat having a contour corresponding to that of the tubular body which presses the gasket against the body when the valve is in the closed position.

2. The valve of claim 1 wherein the valve body and valve member are mounted on a frame for movement between the closed position and an open position in which the valve member and the valve body are separated from each other.

3. The valve of claim 2 wherein the valve member is mounted in a fixed position on the frame, and the valve body is mounted for movement toward and away from the valve member.

4. The valve of claim 3 including an operating screw interconnecting the valve body and frame, with a handle for turning the screw to move the valve body toward and away from the valve member.

5. The valve of claim 1 wherein the passageway extends horizontally, and the outlet port is on the under side of the tubular valve body.

6. The valve of claim 1 wherein the side wall of the tubular valve body is cylindrical, and the seat which presses the gasket against the cylindrical side wall is cylindrically curved.

7. A concrete pumping system comprising a concrete pumper, a pumping line through which concrete is pumped by the pumper, and a pressure relief/drainage valve connected inline with the pumping line having a valve body with an axially extending passageway through which concrete flowing in the pumping line passes, an outlet port in a side wall of the valve body in direct communication with the passageway, and a valve member outside the body having a closed position in which the valve member closes the port and prevents concrete from passing through the port and an open position in which the valve member is spaced away from the valve body and concrete is discharged directly through the outlet port.

8. The valve of claim 7 wherein the valve body and valve member are mounted on a frame for movement between the closed position in which the valve member is in sealing engagement with the valve body and the open position in which the valve member and is spaced away from the valve body.

9. The valve of claim 8 wherein the valve member is mounted in a fixed position on the frame, and the valve body is mounted for movement toward and away from the valve member.

10. The valve of claim 9 including an operating screw interconnecting the valve body and frame, with a handle for turning the screw to move the valve body toward and away from the valve member.

11. The valve of claim 7 wherein the outlet port extends through a cylindrical side wall of the valve body, and the valve member comprises a plug which extends into the outlet port and a gasket that makes sealing engagement with the cylindrical side wall when the valve is in the closed position.

12. The valve of claim 11 wherein the gasket is disposed in a cylindrically curved seat which presses the gasket against the cylindrical side wall when the valve is in the closed position.

13. An inline pressure relief/drainage valve for a concrete pumper, comprising a frame, a valve body mounted on the frame for movement along the frame, a flow passageway in the valve body extending in a direction perpendicular to the frame, means for connecting the valve body inline with a pumping line so that concrete flowing in the line passes through the flow passageway, an outlet port in a side wall of the valve body, a valve member outside the valve body mounted in a fixed position on the frame and in alignment with the outlet port, and means for moving the valve body along the frame between a closed position in which the valve member is in sealing engagement with the valve body and prevents concrete from flowing through the outlet port and an open position in which the valve body is spaced away from the valve member and concrete can flow from the pumping line through the outlet port.

14. The valve of claim 13 wherein the valve body comprises a tubular member through which the flow passageway extends, with the outlet port being formed in the side wall of the tubular member and the tubular member having axially aligned end portions on opposite sides of the outlet port to which the pumping line is connected.

15. The valve of claim 14 wherein the valve member comprises a plug which extends into the outlet port, a gasket that makes sealing engagement with the side wall of the tubular member around the outlet port, and a valve seat having a curvature corresponding to that of the tubular member for pressing the gasket against the tubular member when the valve is in the closed position.

16. The valve of claim 1 wherein the outlet port is formed by cutting a piece from the side wall of the tubular member, and the plug has substantially the same size and shape as the piece cut from the side wall.

17. The valve of claim 13 wherein the frame has a pair of vertically extending frame members on which the valve body is slidably mounted, with the outlet port on the lower side of the valve body and the valve member positioned beneath the outlet port.

18. The valve of claim 13 wherein the means for moving the valve member along the frame comprises an operating screw which is rotatively mounted on the frame and threadedly connected to the valve body, with an operating handle for turning the screw.

* * * * *